UNITED STATES PATENT OFFICE.

OSCAR BALLY, OF MANNHEIM, GERMANY, ASSIGNOR TO BADISCHE ANILIN & SODA FABRIK, OF LUDWIGSHAFEN-ON-THE-RHINE, GERMANY, A CORPORATION.

VAT DYES.

1,128,836.  Specification of Letters Patent.  Patented Feb. 16, 1915.

No Drawing.  Application filed August 14, 1913. Serial No. 784,811.

*To all whom it may concern:*

Be it known that I, OSCAR BALLY, citizen of the Swiss Republic, residing at Mannheim, Germany, have invented new and useful Improvements in Vat Dyes, of which the following is a specification.

I have found that I can obtain new and valuable coloring matters by introducing an organic radical, such for instance as an alkyl, aryl, aralkyl, aldehyde, or acid radical, or the like, into an amino group of an amino derivative of a dibenzanthrone. As instances of dibenzanthrones I mention those obtainable as described in the specifications of Letters Patent Nos. 809,892, 818,992, 906,367 and 1,003,268, and include both those compounds which are regarded as possessing the dibenzanthrone grouping

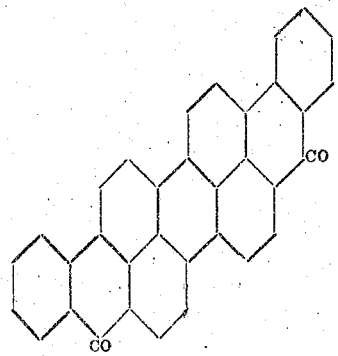

and those which are regarded as possessing the isodibenzanthrone grouping

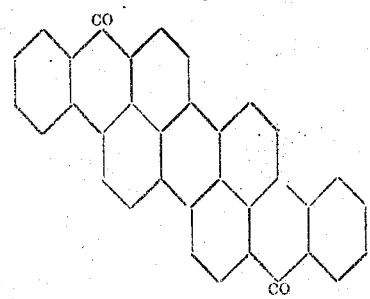

The vat coloring matters thus obtained dye cotton generally shades which are different from those produced by the original compounds into which the said radicals have not been introduced.

The following examples will serve to illustrate further how my invention can be carried into practical effect, but the invention is not confined to these examples. The parts are by weight:

Example 1: Heat together in an autoclave, for about 6 hours, at 150° C., 1 part of amino-dibenzanthrone (obtainable as described in Example 3 of Patent No. 796,393) and 5 parts of ethyl iodid. Then distil off the excess of ethyl iodid, dissolve the residue in concentrated sulfuric acid, precipitate by pouring the solution into water, filter off the precipitate and make it into a paste.

Example 2: Boil together 1 part of amino-dibenzanthrone and 10 parts of benzoyl chlorid, until the evolution of hydrochloric acid ceases. When the mass is cold, filter off the reaction product, wash it with alcohol and dry it.

Example 3: Dissolve 3 parts of amino-isodibenzanthrone (obtainable as described in Patent No. 1,063,000) in 100 parts of 97% sulfuric acid, and commencing at about 30° C. add slowly, while shaking, 20 parts of 40% formaldehyde solution. The temperature rises to about from 100° to 110° C. and the solution, which is at first green, becomes blue. Complete the reaction by heating for about another hour at from 90° to 100° C. Pour the melt into water, filter off the product, wash it and make it into a paste.

The following table gives some of the properties of a few of the products obtainable according to this invention:

| Coloring matter from— | Appearance of dry powder. | Color of solution in conc. sulfuric acid. | Dyes cotton from vat. |
|---|---|---|---|
| Amino - dibenzanthrone + ethyl iodid. | Dark brown | Violet blue | Bordeaux red. |
| Amino - dibenzanthrone + benzyl chlorid. | Dark brown | Blue-violet. | Violet-red. |
| Amino - dibenzanthrone + benzoyl chlorid. | Violet-black. | Dull blue-violet. | Blue - violet. |
| Amino - isodibenzanthrone + ethyl iodid. | Dark bronze | Blue-green | Violet. |
| Amino - isodibenzanthrone + benzyl chlorid. | Dark bronze | Blue-green | Violet. |
| Amino - isodibenzanthrone + formaldehyde. | Dark bronze | Blue-green | Violet. |

In a similar manner, other radicals can be introduced into the aforesaid amino compounds.

Now what I claim is:—

1. The process of producing vat dyes of the anthraquinone series by introducing an organic radical into an amino group of an amino derivative of a dibenzanthrone.

2. The process of producing a vat dye of the anthraquinone series by reacting on amino-dibenzanthrone with ethyl iodid.

3. The new vat dyes which are amino derivatives of a dibenzanthrone containing an organic radical attached to the amino group, which new dyes consist, when dry, of dark powders, yield from blue-green to blue-violet solutions in concentrated sulfuric acid, and dye cotton from a hydrosulfite vat from Bordeaux red to blue-violet shades.

4. The new vat dye which is ethyl-amino-dibenzanthrone and consists, when dry, of a dark brown powder, which yields a violet-blue solution in concentrated sulfuric acid, and which dyes cotton from a vat Bordeaux red shades.

In testimony whereof I have hereunto set my hand in the presence of two subscribing witnesses.

OSCAR BALLY.

Witnesses:
JOSEPH PFEIFFER,
ERNEST F. EHRHARDT.